US 9,011,579 B2

(12) United States Patent
Kulkarni et al.

(10) Patent No.: US 9,011,579 B2
(45) Date of Patent: Apr. 21, 2015

(54) AIR TREATMENT APPARATUS AND SYSTEMS COMPRISED THEREOF

(75) Inventors: Abhijeet Madhukar Kulkarni, Basingstoke (GB); Martin Gregory Hatfield, Odessa, MO (US); Richard Michael Ashley Mann, Basingstoke (GB)

(73) Assignee: BHA Altair, LLC, Franklin, TN (US)

( * ) Notice: Subject to any disclaimer, the term of this patent is extended or adjusted under 35 U.S.C. 154(b) by 291 days.

(21) Appl. No.: 13/495,653

(22) Filed: Jun. 13, 2012

(65) Prior Publication Data

US 2013/0333567 A1    Dec. 19, 2013

(51) Int. Cl.
*B03C 1/00* (2006.01)
*F02C 7/052* (2006.01)
*F24F 3/16* (2006.01)

(52) U.S. Cl.
CPC ........... *F02C 7/052* (2013.01); *F05D 2260/607* (2013.01); *F24F 3/1603* (2013.01); *F24F 3/166* (2013.01); *F24F 2221/34* (2013.01); *F24F 2221/52* (2013.01)

(58) Field of Classification Search
CPC ...................................................... B01D 45/14
USPC ................................................................ 96/2
See application file for complete search history.

(56) References Cited

U.S. PATENT DOCUMENTS

2004/0159232 A1 *  8/2004  Mohamed ..................... 95/28
2011/0094384 A1    4/2011  Mann et al.

OTHER PUBLICATIONS

An Analysis of Characteristic Fog-Droplet Size Distribution on Guizhou Yunwu Mountain; Ling-Ling Wang, et al., Laboratory for Atmospheric Physics & Environment of China Meteorological Administration; Guizhou Weather Modification Office, 4 pages.
Introduction to Colloidal Dispersions, Brian Vincent; Colloid Science: Principles, Methods, and Applications, 13 pages.

* cited by examiner

*Primary Examiner* — Duane Smith
*Assistant Examiner* — Joubert X Glover
(74) *Attorney, Agent, or Firm* — Reinhart Boerner Van Deuren P.C.

(57) ABSTRACT

This disclosure describes embodiments of an air treatment apparatus that stimulates formation of large moisture droplets from small moisture droplets found in air flowing in power generating systems to a turbo-machine. In one example, the embodiments generate a field that promotes contact between the smaller moisture droplets. This contact can increase the size of moisture droplets to facilitate condensation of moisture out of the air.

18 Claims, 4 Drawing Sheets

AIR TREATMENT APPARATUS AND SYSTEMS COMPRISED THEREOF

BACKGROUND OF THE INVENTION

The subject matter disclosed herein relates to air treatment and filtration devices and, in particular, to various embodiments of an air treatment apparatus that can reduce moisture content, e.g., in air flowing in power generating systems with turbo-machines (e.g., gas and steam turbines).

Power generating systems heating, ventilation, and cooling (HVAC) systems, and other systems often deploy filters and moisture separators to remove moisture and debris from air, e.g., before the air is drawn into a turbo-machine of the power generating system. Examples of moisture separators direct air through a series of non-linear channels. Inertia of the moisture in the air causes the moisture to impact the sidewalls of the channels. This moisture collects on the walls of the channels and drains out of the system, while the air continues to flow through the channels and on to the turbo-machine.

Although these channels can effectively capture large moisture droplets, smaller droplets and particles often remain in the air and can transit downstream into the turbo-machine. Even when these small moisture droplets do condense onto the non-linear channels, the droplets are often too small to develop adhesive forces with the surface to the non-linear channels with force sufficient to overcome the velocity of air moving through the channel. As a result, these small droplets are often swept from the surface of the channel back into the air, which carries the droplets downstream.

Small moisture droplets are prevalent under many scenarios, e.g., in many environments (e.g., coastal areas), climates, and under many weather conditions (e.g., fog). Systems like power generating systems often must operate in these environments despite the unfavorable conditions. To avoid problems, the power generating systems may require a robust solution that reduces the risk and/or rate of deterioration to the components of the power generating systems.

The discussion above is merely provided for general background information and is not intended to be used as an aid in determining the scope of the claimed subject matter.

BRIEF DESCRIPTION OF THE INVENTION

This disclosure describes embodiments of an air treatment apparatus that stimulates formation of large moisture droplets from small moisture droplets found in air, e.g., air flowing in power generating systems to a turbo-machine. In one example, the embodiments generate an electromagnetic field that promotes contact between the smaller moisture droplets. This contact can increase the size of moisture droplets to facilitate condensation of moisture out of the air. An advantage that the practice of some embodiments of the air treatment apparatus is to reduce the moisture content of air flowing through the power generating system, which can prevent clogging of filters and can effectively prevent damage to components of the turbo-machine.

The disclosure describes, in one embodiment, a system that comprises an inlet section for directing ambient air. The inlet section comprises a filter assembly and an air treatment apparatus upstream of the filter assembly. In one example, the air treatment apparatus generates an electromagnetic field having a frequency in the electromagnetic spectrum to irradiate air flowing in the inlet section.

The disclosure also describes, in one embodiment, a system that comprises a filter assembly and an emitter disposed upstream of the filter assembly. In one example, the emitter generates infrared radiation that irradiates air flowing to the filter assembly.

The disclosure further describes, in one embodiment, a system that comprises a weather hood having an inlet and an outlet. The system also comprises an air treatment apparatus disposed in the weather hood. In one example, the air treatment apparatus generates an electromagnetic field having a frequency in the electromagnetic spectrum to irradiate air flowing in the weather hood.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Broadly, embodiments of an air treatment apparatus can help condition intake and exhaust air to reduce the amount of moisture present in the intake and exhaust air. The embodiments are compatible with a variety of systems including power generating systems that include a power generating device (e.g., a turbo-machine and/or reciprocating engine), heating, ventilation, and conditioning (HVAC) systems, air filtration systems, and the like. In the examples discussed below, the air treatment apparatus finds use in power generating systems that deploy turbo-machines (e.g., gas and steam turbines) and related devices. The embodiments help to remove moisture from air that flows through the power generating system to the turbo-machine. In one aspect, the moisture separating apparatus can introduce an electromagnetic field into the air. The electromagnetic field can cause moisture droplets to coalesce into larger, heavier droplets, which are more likely to fall and/or condense out of the air as the air transits the components of the power generating system. This disclosure contemplates still other examples, however, wherein the air treatment apparatus and/or its components are in position to modify the moisture content of air flowing, e.g., in an HVAC system and/or as part of and/or in place of a filtration system.

Figure 1:
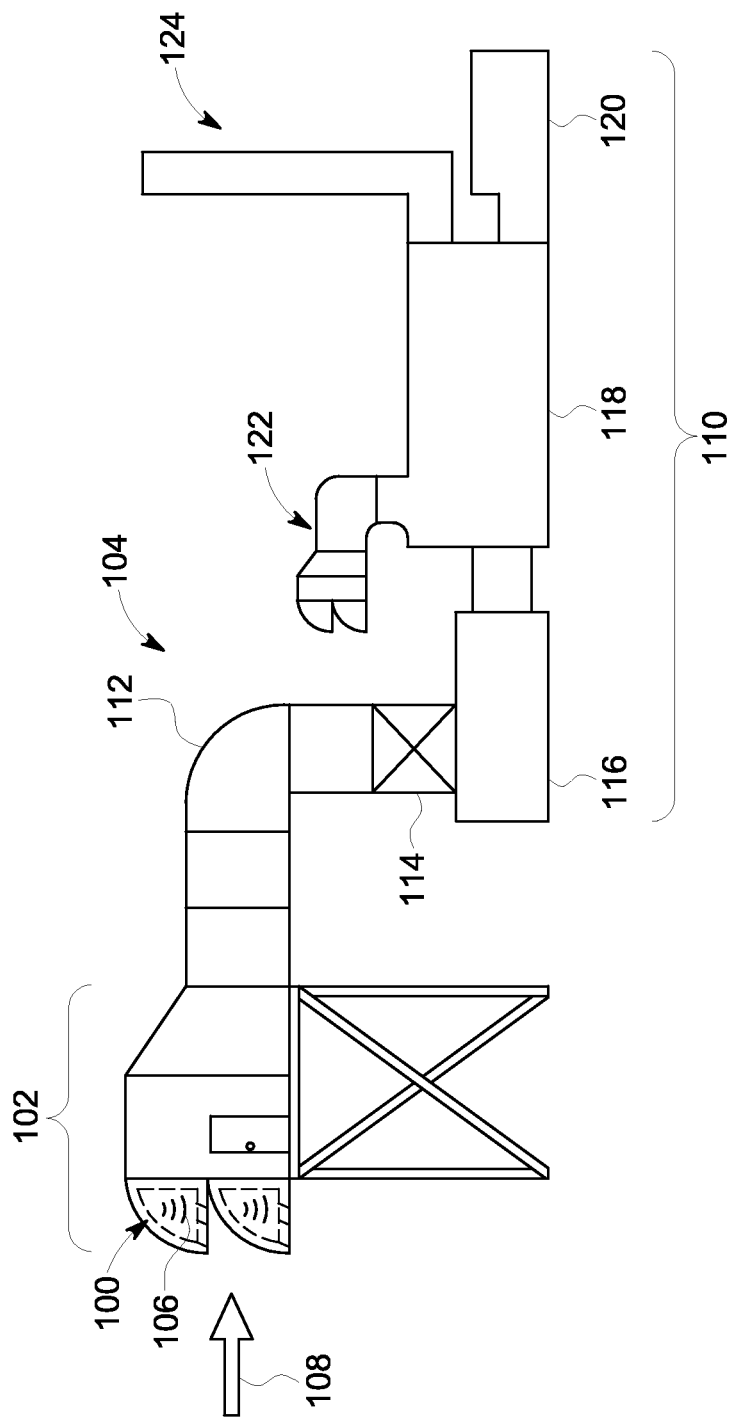
FIG. 1 depicts a schematic, side view of an exemplary air treatment apparatus as part of a system, e.g., a power generating system.

FIG. 1 depicts an exemplary air treatment apparatus 100 (also "apparatus 100") in position at an inlet section 102 of a system (e.g., a power generating system 104). The apparatus 100 generates an electromagnetic field 106 to treat an airstream 108 that flows into the power generating system 102 to a power-generating device (e.g., a turbo-machine 110). The electromagnetic field 106 can have a frequency in the electromagnetic spectrum. In one example, the frequency defines infrared radiation. This disclosure also contemplates radiation in other frequency ranges, e.g., ranges that also cause moisture droplets in the airstream 108 to actively coalesce together. In one example, the inlet section 102 includes a condensing surface proximate the apparatus 100. The condensing surface provides an area on which moisture droplets can condense and, in one example, the condensing surface is in position to allow condensation to dissipate (e.g., flow) out of the inlet section 102 all together.

Moving now from left to right in the diagram of FIG. 1, the power generating system 104 also has an inlet duct 112 that couples the inlet section 102 to the turbo-machine 110 via a silencer assembly 114. The turbo-machine 110 includes a compressor 116, which couples to the silencer assembly 114, and a turbine 118 that drives a generator 120. The turbine 118 may include a turbine inlet 122 and a turbine outlet 124 to evacuate heat and/or combustion gasses from the turbine 118. Other examples of the power generating device can include reciprocating engines and related devices, that are used in place of or combined with gas and steam turbines.

During operation of the power generating system 104, the compressor 116 draws ambient air from the environment surrounding the power generating system 104 into the inlet section 102. The ambient air flows through the electromagnetic field 106. This feature effectively irradiates moisture droplets (and other precipitants and contaminants) in the ambient air. Introducing the electromagnetic field 106 to moisture-laden air can disrupt the natural suspension (or formation) of these moisture droplets. The disruption can cause smaller droplets in the air to coalesce with one another to form larger, heavier moisture droplets. These larger droplets are more likely to condense on or be trapped by components that are part of the apparatus 100, as well as components that are found in the inlet section 102 of the power generating system 104. This feature reduces the moisture content of the flowing air before the air reaches the turbo-machine 110. Lowering the moisture content can help prevent damage (e.g., corrosion) to components downstream of the inlet section 102, e.g., the compressor 116, the turbine 118, the generator 120.

Figure 2:
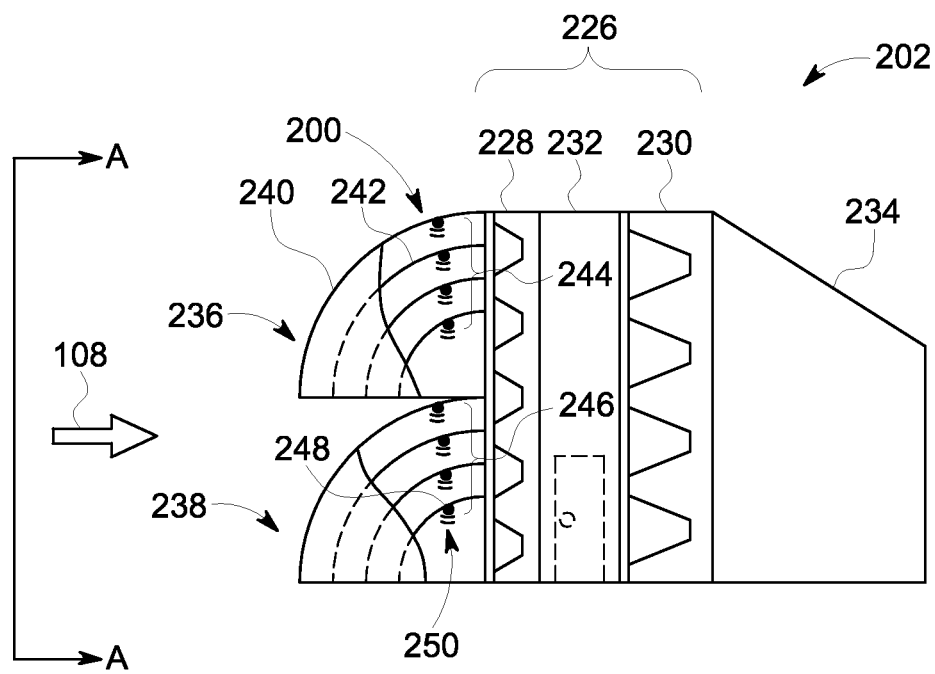
FIG. 2 depicts a schematic, side view of an inlet to a power generating system that includes an exemplary air treatment system.
Figure 3:
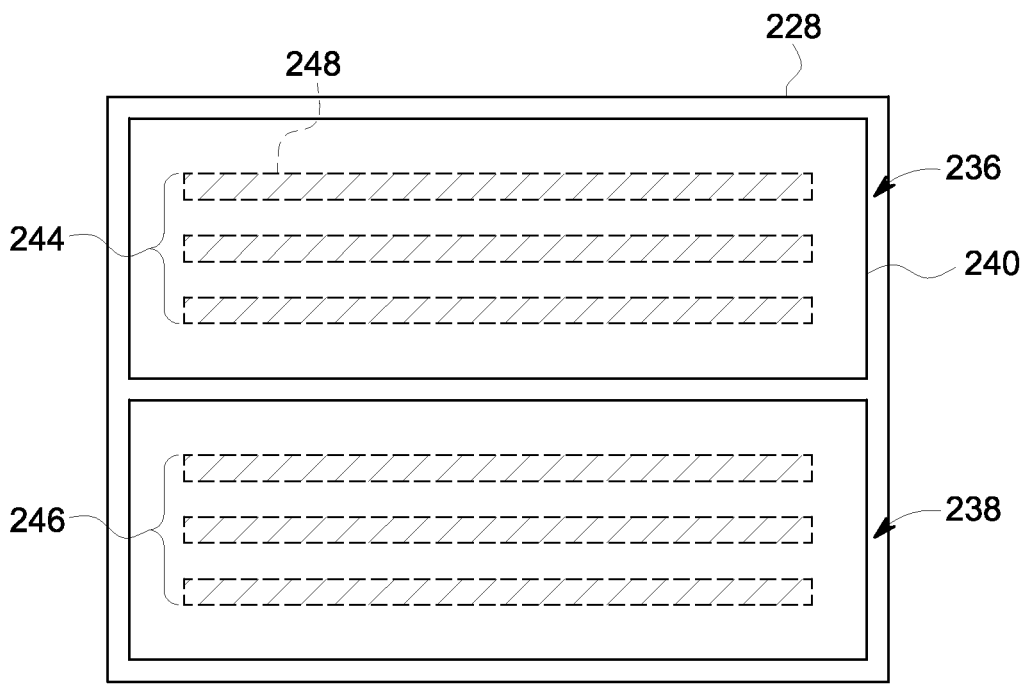
FIG. 3 depicts a front view of the system of FIG. 2.
Figure 4:
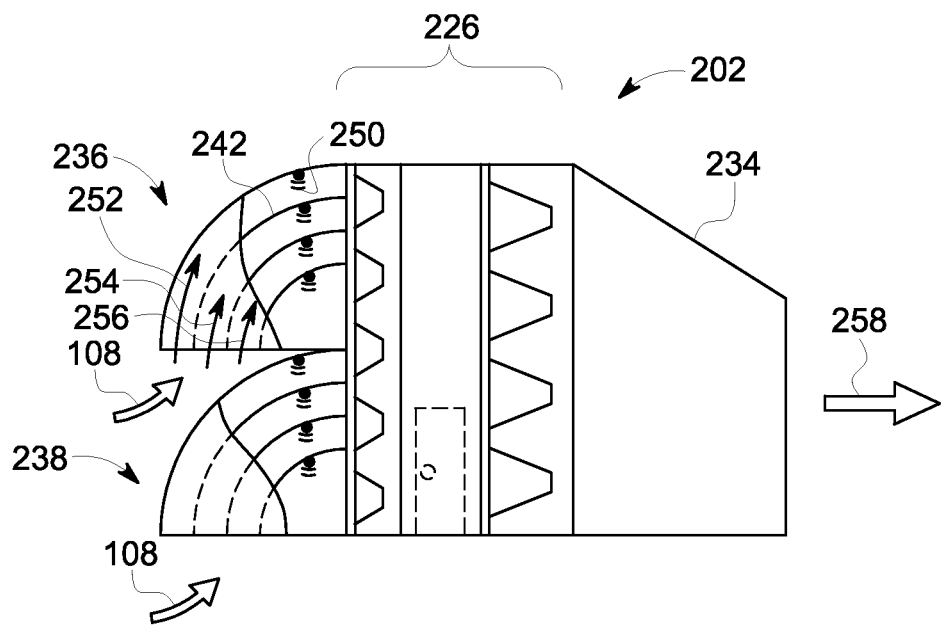
FIG. 4 depicts a flow pattern at the inlet of FIG. 2.

FIGS. 2, 3, and 4 depict another example of an air treatment apparatus 200 (also "apparatus 200") that can remove moisture droplets from airstream 108. FIG. 2 shows a side, partial cross-section view of an inlet section 202 to illustrate one implementation of the apparatus 200. FIG. 3 shows a front view of the inlet section 202 taken at line A-A of FIG. 2. FIG. 4 illustrates an exemplary flow pattern that can occur in the inlet section 202.

In FIG. 2, the inlet section 202 includes a filter assembly 226 with a first filter unit 228, a second filter unit 230, and an access unit 232 disposed therebetween. A transition 234 couples the downstream side of the filter assembly 226, e.g., to the inlet duct 112 of FIG. 1. A pair of weather hoods (e.g., a first weather hood 236 and a second weather hood 238) couple to the upstream side of the filter assembly 226. Examples of the weather hoods 236, 238 prevent precipitants (e.g., rain, ice, snow, etc.) and large debris (e.g., leaves) from entering the filter assembly 226. The weather hoods 236, 238 include an outer housing 240 and a plurality of guide vanes 242, which collectively form channels to direct air through the weather hoods 236, 238 into the first filter unit 228. The guide vanes 242 can form the condensing surface on which moisture droplet in the air condense. In other examples, the condensing surface may be in position in the filter assembly 226.

The apparatus 200 includes one or more emitter arrays (e.g., a first emitter array 244 and a second emitter array 246), each with one or more emitters 248 that can generate infrared radiation 250. The emitter arrays 244, 246 reside in the weather hoods 236, 238. In one example, the emitters 248 secure to the structure of the weather hoods 236, 238, e.g., to the outer housing 240 and/or the guide vanes 242. This configuration directs the infrared radiation 250 into the channels to irradiate air flowing therethrough.

As best shown in FIG. 3, the emitters 248 can extend lengthwise, or transverse, across the width of the weather hoods 236, 238. This configuration can irradiate a majority of the air that flows through the channels. The emitters 248 can comprise a single, elongated member. In other examples, the emitters 248 can comprise an arrangement of smaller, separate devices that are in position to extend substantially across the width of the weather hoods 236, 238.

Exemplary devices for use as the emitters 248 emit waves and, in a more particular construction, waves with a frequency in the electromagnetic spectrum. These devices can include light generating devices (e.g., light bulbs and tubes, light emitting diode (LED) devices, etc.) and heat generating devices. Any one of these devices can secure within the weather hoods 236, 238 using fasteners (e.g., screws, bolts, etc.). Intermediary components can provide structure to support the emitters 248 in position within the weather hoods 236, 238. Such structure may provide, among other things, operative support to the emitters 248, access to the emitters for purposes of maintenance (e.g., replacement) and repair, and features to permit adjustment to the position of the emitters 248, e.g., to change the direction of radiation that arises from the emitters 248.

FIG. 4 illustrates the inlet section 202 of FIG. 2 with arrows to show the flow pattern that occurs in the weather hoods 236, 238. As shown in this diagram, the vane guides 242 separate the airflow 108 into a plurality of airstreams (e.g., a first airstream 252, a second airstream 254, and a third airstream 256). The airstreams 252, 254, 256 traverse the channels in the weather hood 236, passing through the infrared radiation 250 before entering into the filter assembly 226. In one example, the airstreams 252, 254, 256 pass via the filter assembly 226 to the transition 234 to form a turbine airstream 258, which flows to a power generating device (e.g., turbo-machine 110 of FIG. 1).

In one implementation, the infrared radiation 250 has a frequency that is likely to cause moisture droplets having a first diameter to coalesce into moisture droplets having a second diameter, which is larger than the first diameter. Droplets of this size contact the guide vanes 242 (or condensing surface) or other objects in the filter assembly 226 and adhere to the surface of contact with sufficient force to prevent further travel of the droplets. In one example, the adhesion forces prevent the droplets from being swept away due to the velocity of the continuously flowing airstreams 252, 254, 256 in the weather hoods 236, 238.

As discussed above, implementation of the apparatus 200 can help to remove moisture and/or certain contaminants from air that flows through the inlet section 202. For example, and with reference to FIG. 4, the moisture content of the airflow 108 may have a first value and the moisture content of the turbine airstream 258 may have a second value. Use of the apparatus 200 can treat the incoming air to cause the second value to fall below the first value. This feature is particularly advantageous for use with systems (e.g., power generating system 104 of FIG. 1) found in wet climates in which ambient air can exhibit certain properties (e.g., moisture content and/or relative humidity) that are relatively higher than other climates. Moreover, weather conditions such as fog, rain, and winds can change these properties to levels that would allow moisture droplets in the air, if left untreated, to clog filters in the filter assembly 226 and/or to cause corrosion and other damage to occur in the power generating device (e.g., turbo-machine 110 of FIG. 1).

Figure 5:
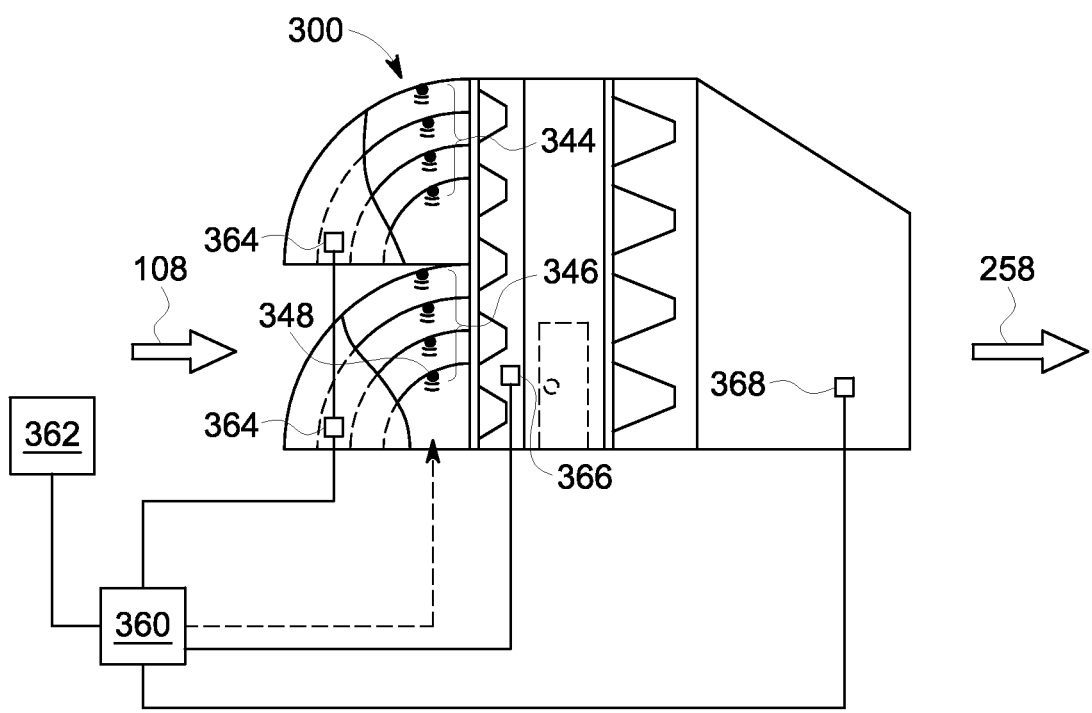
FIG. 5 depicts a schematic, side view of an exemplary air treatment apparatus.

FIG. 5 depicts another exemplary air treatment apparatus 300 (also "apparatus 300") that can reduce moisture in air flowing through a power generating system (e.g., power generating system 104 of FIG. 1). The apparatus 300 includes a first emitter array 344 and a second emitter array 346, each with a plurality of emitters 348. The apparatus 300 couples with a control device 360 and one or more sensors, generally identified by the numerals 362, 364, 366, and 368.

Embodiments of the apparatus 300 may identify changes in the properties of airflow 108 flowing, e.g., through the inlet section 102, 202 of FIGS. 1, 2, 3, and 4. For example, the apparatus 300, the control device 360, and the sensors 362, 364, 366, and 368 may form a feedback loop, which monitors properties of airflow 108. Examples of the sensors 362, 364, 366, and 368 may include devices that can generate signals indicative of relative humidity, moisture, pressure, velocity, and the like. The control device 360 can use these signals to modify operation of the emitters 348. For example, if the control device 360 determines that the moisture content of airflow 108 exceeds a first threshold level, then the control device 360 can issue instructions to change certain operating features (e.g., intensity, output, frequency) of the emitters 348. In other examples, if the control device 360 identifies that the moisture content of the turbine airstream 258 exceeds a second threshold level, then the control device 360 can issue instructions that change one or more of the operating features of the emitters 348 to improve moisture capture.

Figure 6:
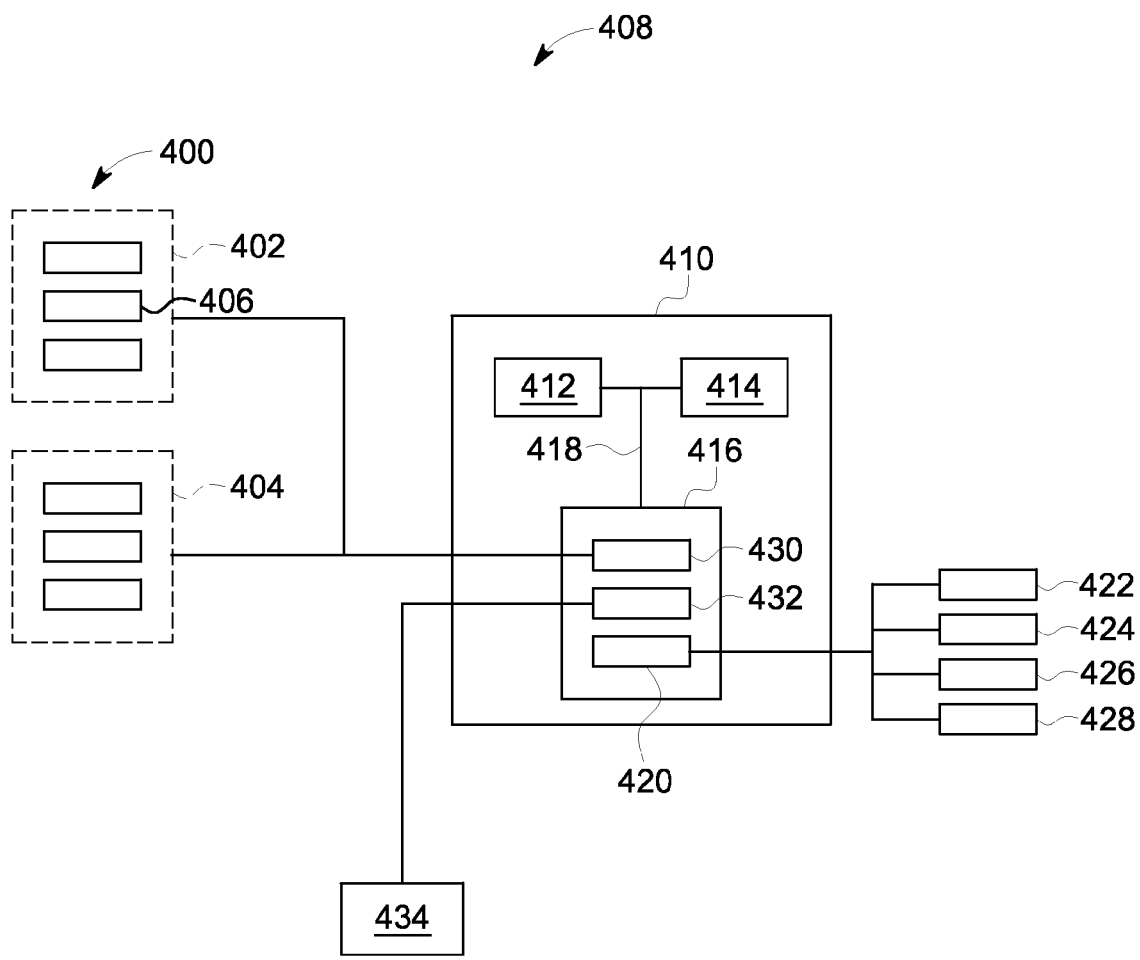
FIG. 6 depicts a schematic wiring diagram of an exemplary air treatment apparatus.

FIG. 6 illustrates a schematic diagram of a high level wiring scheme for another exemplary air treatment apparatus 400 that can reduce moisture levels in air flowing through a power generating system (e.g., power generating system of FIG. 1). The apparatus 400 includes a first emitter array 402 and a second emitter array 404, each having a plurality of emitters 406. The apparatus 400 is part of a system 408 that includes a control device 410 that can exchange signals with the apparatus 400 to effectuate operation of the emitters 406. The control device 410 has a processor 412, memory 414, and control circuitry 416. Busses 418 couple the components of the control device 410 together to permit the exchange of signals, data, and information from one component of the control device 410 to another. In one example, the control circuitry 416 comprises sensing circuitry 420 which couples with sensors (e.g., an ambient humidity sensor 422, a weather hood humidity sensor 424, a filter assembly humidity sensor 426, and a transition humidity sensor 428). The control circuitry 416 also includes emitter circuitry 430 and power circuitry 432 that couple to, respectively, the first emitter array 402 and/or the second emitter array 404 and a power supply 434.

This configuration of components can dictate operation of the apparatus 400 to reduce the moisture levels of airstreams that flow through a system (e.g., power generating system 104 of FIG. 1). For example, one or more of the sensors 422, 424, 426, 428 can provide signals (or inputs) that relate to information about the ambient air surrounding the power generating system as well as information about the air flowing through power generating system. In addition to relative humidity, the information may also include weather information (e.g., temperature, barometric pressure, etc.) as well as information about conditions inside of the power generating system, e.g., inside of turbo-machine 110 (FIG. 1).

Features of the control device 410 can also facilitate operation and control of the apparatus 400. The control device 410 and its constructive components, for example, can communicate amongst themselves and/or with other circuits (and/or devices), which execute high-level logic functions, algorithms, as well as executable instructions (e.g., firmware instructions, software instructions, software programs, etc.). Exemplary circuits of this type include, but are not limited to, discrete elements such as resistors, transistors, diodes, switches, and capacitors. Examples of the processor 412 include microprocessors and other logic devices such as field programmable gate arrays ("FPGAs") and application specific integrated circuits ("ASICs"). Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The structure of the components in system 408 can permit certain determinations as to the humidity of air that flows through the power generating system. For example, the electrical circuits of the control device 410 can physically manifest theoretical analysis and logical operations and/or can replicate in physical form an algorithm, a comparative analysis, and/or a decisional logic tree, each of which operates to assign the output and/or a value to the output that correctly reflects one or more of the nature, content, and origin of the changes that occur and that are reflected by the relative inputs to the emitters 406 as provided by the corresponding control circuitry, e.g., in the control circuitry 416.

In one embodiment, the processor 412 is a central processing unit (CPU) such as an ASIC and/or an FPGA that is configured to instruct and/or control operation of the emitters 406. This processor can also include state machine circuitry or other suitable components capable of controlling operation of the components as described herein. The memory 414 includes volatile and non-volatile memory and can store executable instructions in the form of and/or including software (or firmware) instructions and configuration settings. Each of the sensing circuitry 420, the emitter circuitry 430, and power circuitry 432 can embody stand-alone devices such as solid-state devices. Examples of these devices can mount to substrates such as printed-circuit boards and semi-conductors, which can accommodate various components including the processor 412, the memory 410, and other related circuitry to facilitate operation of the control device 408 in connection with its implementation in the system 408.

However, although FIG. 6 shows the processor 412, the memory 414, the components of the control circuitry 416 as discrete circuitry and combinations of discrete components, this need not be the case. For example, one or more of these components can comprise a single integrated circuit (IC) or other component. As another example, the processor 412 can include internal program memory such as RAM and/or ROM. Similarly, any one or more of functions of these components can be distributed across additional components (e.g., multiple processors or other components).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    an inlet section for directing ambient air, the inlet section comprising a filter assembly and an air treatment apparatus upstream of the filter assembly, the air treatment apparatus generating an electromagnetic field having a frequency in the electromagnetic spectrum to irradiate air flowing in the inlet section; and
    a weather hood disposed upstream of the filter assembly, wherein the electromagnetic field irradiates air in the weather hood.

2. The system of claim 1, wherein the weather hood forms a plurality of airstreams.

3. The system of claim 1, wherein the weather hood comprises a channel forming a first airstream and a second airstream, and wherein the air treatment apparatus irradiates at least one of the first airstream and the second airstream.

4. The system of claim 1, further comprising a guide vane upstream of the filter assembly, wherein the air treatment apparatus comprises an emitter disposed on the guide vane, and wherein the emitter generates the electromagnetic field.

5. The system of claim 1, wherein the electromagnetic field comprises infrared radiation.

6. The system of claim 1, wherein the electromagnetic field comprises a plurality of individual electromagnetic fields.

7. The system of claim 1, further comprising a sensor and a control device coupled with the sensor and with the air treatment apparatus, wherein the control device generates instructions to change a parameter of the electromagnetic field in response to the sensor.

8. The system of claim 7, wherein the sensor monitors the relative humidity of air in the inlet section.

9. The system of claim 7, wherein the sensor monitors the relative humidity of air that exits the inlet section.

10. A system, comprising:
    a filter assembly;
    an emitter disposed upstream of the filter assembly, the emitter generating infrared radiation that irradiates air flowing to the filter assembly; and
    a weather hood coupled to an upstream side of the filter assembly.

11. The system of claim 10, wherein the emitter is positioned inside of the weather hood.

12. The system of claim 10, further comprising a condensing surface proximate the emitter, wherein the condensing surface receives moisture droplets from the air.

13. The system of claim 10, further comprising a sensor and a control device coupled with the sensor and with the emitter, wherein the control device generates instructions to change a parameter of the electromagnetic field in response to the sensor.

14. A system, comprising:
    a weather hood having an inlet and an outlet; and
    an air treatment apparatus disposed in the weather hood, the air treatment apparatus generating an electromagnetic field having a frequency in the electromagnetic spectrum to irradiate air flowing in the weather hood.

15. The system of claim 14, wherein the weather hood separates the air into a first airstream and a second airstream.

16. The system of claim 15, wherein the electromagnetic field comprises a first electromagnetic field for the first airstream and a second electromagnetic field for the second airstream.

17. The system of claim 14, further comprising a condensing surface disposed in the weather hood.

18. The system of claim 17, wherein the condensing surface is part of a guide vane that extends from the inlet to the outlet, and wherein the air treatment apparatus resides between the inlet and the outlet.

\* \* \* \* \*